United States Patent
Graham et al.

(10) Patent No.: US 11,474,680 B2
(45) Date of Patent: Oct. 18, 2022

(54) CONTROL ADJUSTED MULTIMEDIA PRESENTATION DEVICES

(71) Applicant: Hewlett-Packard Development Company, L.P., Spring, TX (US)

(72) Inventors: Christoph Graham, Spring, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/734,680

(22) PCT Filed: Mar. 1, 2019

(86) PCT No.: PCT/US2019/020372
§ 371 (c)(1),
(2) Date: Dec. 3, 2020

(87) PCT Pub. No.: WO2020/180283
PCT Pub. Date: Sep. 10, 2020

(65) Prior Publication Data
US 2021/0389867 A1    Dec. 16, 2021

(51) Int. Cl.
*G06F 3/0484*      (2022.01)
*G09G 5/02*        (2006.01)
*G06F 3/04847*     (2022.01)
*G06F 3/14*        (2006.01)
*G06F 3/16*        (2006.01)

(52) U.S. Cl.
CPC ........ *G06F 3/04847* (2013.01); *G06F 3/0484* (2013.01); *G06F 3/14* (2013.01); *G06F 3/16* (2013.01); *G09G 5/02* (2013.01); *G09G 2354/00* (2013.01); *G09G 2360/145* (2013.01)

(58) Field of Classification Search
CPC .......... G06F 3/04847; G06F 3/14; G06F 3/16; G06F 3/0484; G09G 5/02; G09G 2354/00; G09G 2360/145; H04M 2250/12; H04M 3/569; H04M 3/567
See application file for complete search history.

(56) References Cited

U.S. PATENT DOCUMENTS

| 6,992,692 B2 | 1/2006 | Gu et al. |
| 7,061,871 B2 | 6/2006 | Sheldon et al. |
| 8,502,825 B2* | 8/2013 | Zalewski ............... A63F 13/12 345/473 |
| 2004/0220965 A1* | 11/2004 | Harville .................. G06F 16/58 |
| 2007/0180106 A1 | 8/2007 | Pirzada et al. |
| 2008/0235582 A1 | 9/2008 | Zalewski et al. |

(Continued)

FOREIGN PATENT DOCUMENTS

| EP | 2814244 A1 | 12/2014 |
| WO | 2010/058376 A2 | 5/2010 |

Primary Examiner — Vijay Shankar
(74) Attorney, Agent, or Firm — Fabian VanCott

(57) ABSTRACT

In an example implementation according to aspects of the present disclosure, a system comprising a sensor, a multimedia presentation device, and a controller. The controller may be configured to receive telemetry from the multimedia device and receive a multimedia capture from the sensor. The controller compares the multimedia capture to a control element and determines a relationship between the telemetry and the comparison. Based on the determination, the controller adjusts the configuration of the multimedia presentation device.

20 Claims, 4 Drawing Sheets

(56) References Cited

U.S. PATENT DOCUMENTS

| | | | |
|---|---|---|---|
| 2009/0070121 A1* | 3/2009 | Leonelli | G06Q 10/06 |
| | | | 705/301 |
| 2010/0058376 A1 | 3/2010 | Alhadeff et al. | |
| 2015/0341812 A1 | 11/2015 | Dion et al. | |
| 2016/0327925 A1* | 11/2016 | Leonelli | G05B 19/0426 |
| 2018/0117465 A1 | 5/2018 | Voris et al. | |
| 2018/0146310 A1 | 5/2018 | Bazzoni | |
| 2021/0084670 A1* | 3/2021 | Chauhan | H04W 72/1289 |

* cited by examiner

CONTROL ADJUSTED MULTIMEDIA PRESENTATION DEVICES

BACKGROUND

Multimedia presentation devices provide capabilities to allow users to interact with one another. The interaction may be supported by multiple video, audio and content streams of data.

DETAILED DESCRIPTION

Multimedia presentation devices support interaction between users often in disparate locations. The devices may include but are not limited to teleconferencing systems. In other implementations the multimedia presentation devices may be implemented on computing platforms that provide infrastructure and support for capturing multimedia presentations, audio and video of the participants. Computing platforms may include desktop computers, laptop computer, and mobile devices. In some implementations, the infrastructure may include networking interfaces including local area network (LAN), wide area network (WAN), and internet connections. The network infrastructure may utilize connection or connectionless protocols. In either protocol implementation communication or data packets may be dropped creating an interruption or a degradation of the interactions between users. Interpreting an interruption as a relation to a user's experience often is a subjective task. Current systems often provide no feedback loop to evaluate subjective aspects of the interaction to the users, and thereby provide any self-corrective action. As described herein, a system to control adjusted multimedia presentation devices may include a controller, a sensor, and a multimedia presentation device. The controller may receive telemetry corresponding to the multimedia presentation device. The telemetry may include metrics corresponding to the multimedia presentation. The controller may also receive a multimedia capture from a sensor. The controller may compare the multimedia capture to a control element and determine a relationship between the telemetry and that comparison. Based on the determination, the system adjusts the configuration of the multimedia presentation device to the experience of the users.

Figure 1:
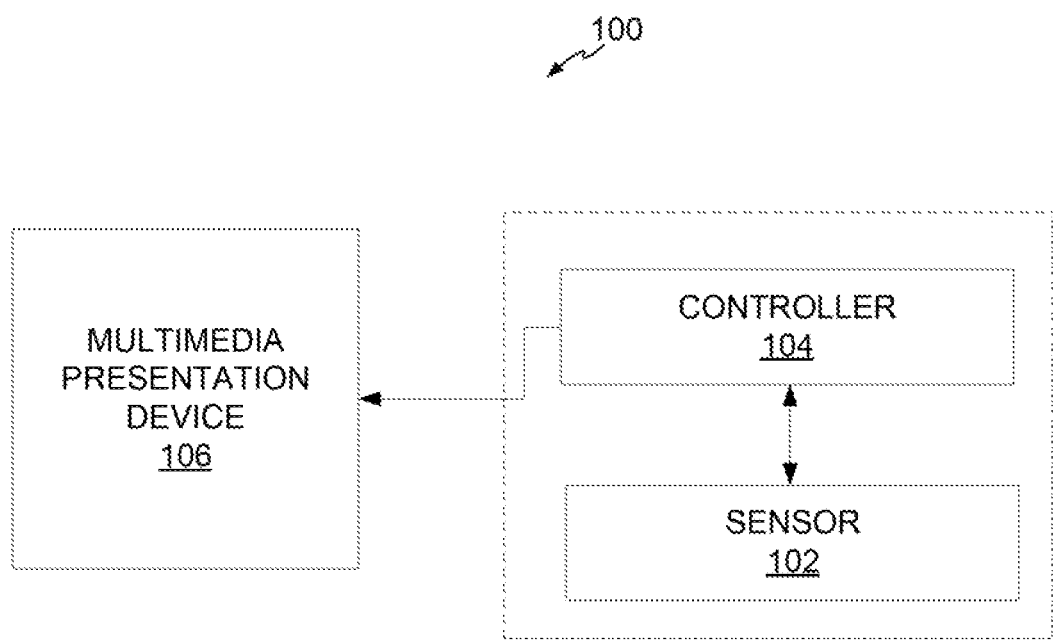
FIG. 1 is a block diagram illustrating a system to control adjusted multimedia presentation devices, according to an example.

FIG. 1 is a block diagram illustrating a system to control adjusted multimedia presentation devices, according to an example. The system 100 may include a sensor 102, a controller 104, and a multimedia presentation device 106.

The sensor 102 may be an integrated data collection device. In some implementations, the sensor 102 may be a digital camera. The sensor 102 may be configured to capture aspects of the interaction with the multimedia presentation device. For example, the sensor 102 may be implemented as a camera present in the same physical space as the multimedia presentation device. The sensor 102 may capture aspects of the interaction of a user utilizing the multimedia presentation device. In another embodiment, the sensor 102 may capture aspects of the physical space where the multimedia presentation device is located. In other implementations the sensor 102 may be a digital microphone. For example, the sensor 102 may be implemented as a digital microphone present in the same physical space as the multimedia presentation device. The sensor 102 may collect audio from either the physical space, the multimedia presentation device itself, or both.

A controller 104 may provide the logic to receive multimedia captures and telemetry from the sensor 102 and the multimedia presentation device 106. The controller 104 may be a networked device, present on the same network as the multimedia presentation device 106. Alternatively, the controller 104 may interface directly with the multimedia presentation device 106 through an electrical communicative connection including but not limited to universal serial bus (USB). In either implementation, the controller 104 may include logic to access and modify configuration details and parameters of the multimedia presentation device 106. In the USB example, the controller 104 may interface an application programming interface (API) of the multimedia presentation device 106 through signaling to modify configuration aspects of the device. In the networking example, the controller 104 may interface an API utilizing encapsulated command sets packaged in the application layer of data packets. In another implementation, the controller 104 may generate suggestions to a user through the multimedia presentation device on corrective action that may solve multimedia captures. Suggestions may include corrective actions outside controlled by the multimedia presentation device 106. For example, suggestions may include adjusting ambient lighting, and repositioning the multimedia presentation device 106.

The multimedia presentation device 106 provides the user the support device and infrastructure to participate in remote teleconferencing. In common implementations, the multimedia presentation device 106 may include one or more cameras for capturing video, one or more microphones for capturing audio, and an audio/visual display for perceiving the remote users. In other implementations, the multimedia presentation device 106 may include a computing system to allow participants in a teleconference the ability to share digital presentations, such as slide decks and non-live user video, such as movies.

In another implementation, the multimedia presentation device 106 may be an integrated computing system such as a desktop computer, laptop computer, or mobile device. The controller 104 may take the form of that integrated device's central processing unit (CPU). In this implementation the multimedia presentation device 106 and the controller 104 may be hosted within the same physical device. Additionally, a sensor 102 may be connected to or integrated within the same physical device as well.

Figure 2:
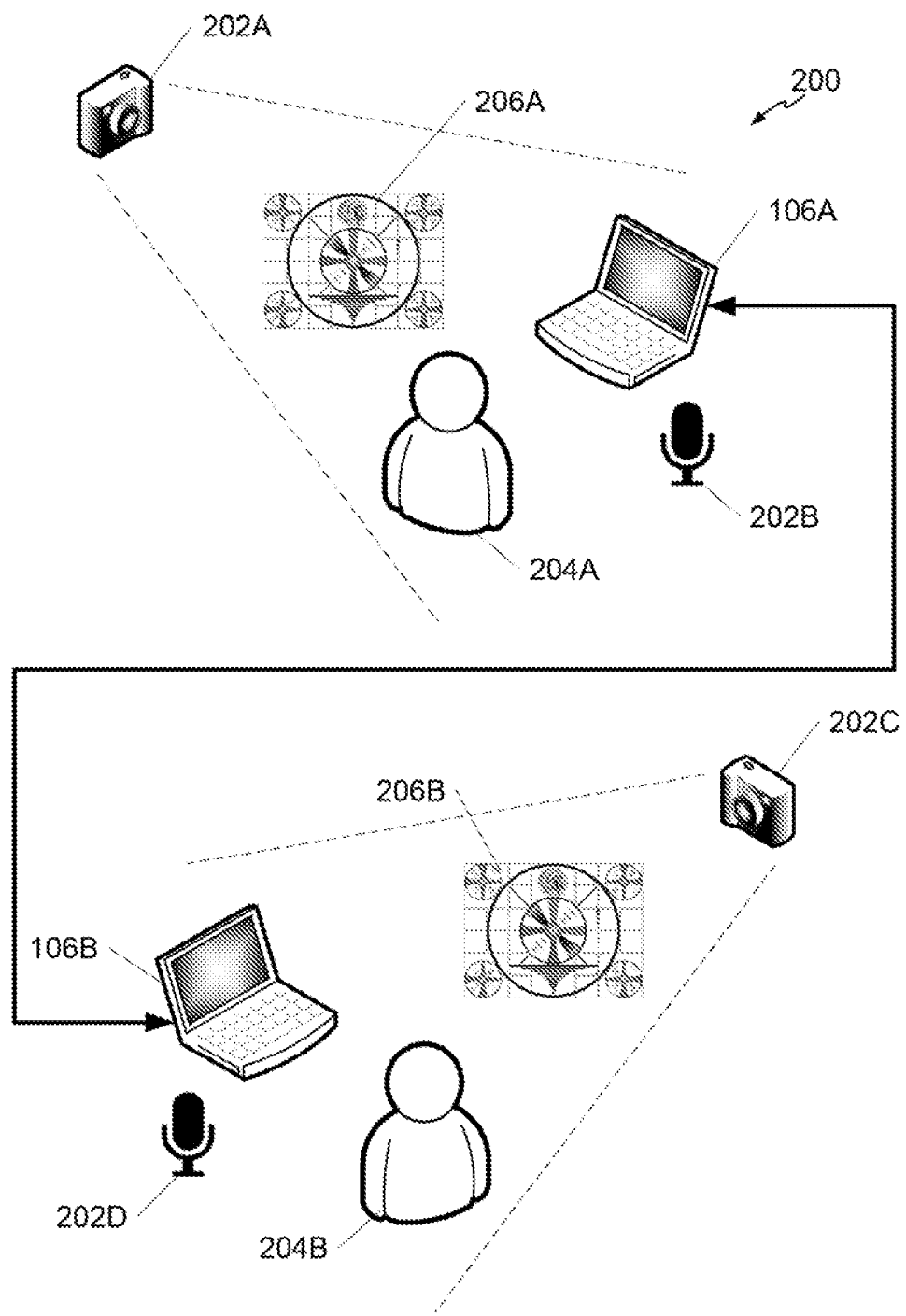
FIG. 2 is an illustration of a system to control adjusted multimedia presentation devices, according to another example of the present disclosure.

FIG. 2 is an illustration of a system 200 to control adjusted multimedia presentation devices, according to another example of the present disclosure. The system 200 may include two endpoints of a teleconferencing system as illustrated by two multimedia presentation devices 106A, 106B. The multimedia presentation devices 106A, 106B are illustrated in this example as laptop computers, however the physical implementation may also correspond as other configurations described previously. The multimedia presentation device 106A, 106B may be communicatively coupled via networking connections as described previously.

Sensors 202A, 202B, 202C, 202D are connected to the controller (not shown) to capture video and audio of the user's interactions at both ends of the teleconference. In this implementation, the controller may be implemented as the CPU of the multimedia presentation devices 106A, 106B, where the sensors 202A, 202B, 202C, 202D function as peripherals to their respective multimedia presentation devices 106A, 106B. The sensors 202A, 202B, 202C, 202D may create multimedia captures of the users 204A, 204B during a teleconference. A control element 206 may be present within the same physical space and detectable by the sensors 202A, 202B, 202C, 202D. The control element 206A, 206B may be a visual test pattern as illustrated. The control element 206 may include a display pattern with a control color and a control shape. However, the control element 206A, 206B may take additional visual forms where the controller may be able to recognize it in a video stream. In one implementation, the control element 206A, 206B may be a key color of a company logo present on a wall within the physical space of the multimedia presentation devices 106A, 106B. The control element 206A, 206B provides the controller with a known value to which the controller may tune or adjust parameters within the multimedia presentation devices 106A, 106B. In other implementations, the control element 206A, 206B may be auditory or a sound sample. Known samples of user's 204A, 204B may be sampled prior to a teleconference.

The system 200 utilizes the control elements 206A, 206B through the multimedia presentation devices 106A, 106B to adjust the multimedia presentation device 106A, 106B at the other end. For example, a user 204A video teleconferences with another user 204B. The user 204A may see the other user 204B through his corresponding multimedia presentation device 106A. Additionally, the user 204A may also see the control element 206B corresponding to the physical space of the other user 204B. A sensor 202A (visualized here as a digital camera) may also capture a multimedia capture stream containing the control element 206B as represented on the video display of the multimedia presentation device 106A. The controller associated with sensor 202A the compares the multimedia capture stream of the control element 206B against a known value within that control element 206B, like an expected color value. The controller determines a delta relationship by which the control element 206B and the multimedia capture stream of the control element 206B varies. The configuration parameter may include adjusting the microphone gain for the multimedia presentation device 106B. The controller utilizes the delta relationship to update a configuration parameter to the multimedia presentation device 106B on the other side of the teleconference. The configuration parameter may include adjusting the hue, saturation, and value (HSV) for the multimedia presentation device 106B. In some implementations, the configuration parameter may include adjusting lighting within the physical space of the multimedia presentation device. The sensor 202A, controller, and the multimedia presentation device 106B continue this process until the delta relationship is minimized.

A similar implementation of this "feedback loop" may also be implemented using audio rather than video. The user 204A may see the other user 204B through his corresponding multimedia presentation device 106A. Additionally, the user 204A may also hear a control element corresponding to the voice of the other user 204B. A sensor 202B (visualized here as a digital microphone) may also capture a multimedia capture stream containing the control element as represented through the speakers of the multimedia presentation device 106A. The controller associated with sensor 202B the compares the multimedia capture stream of the control element against a known value within that control element (e.g. the user's voice), like a decibel value. The controller determines a delta relationship by which the control element and the multimedia capture stream of the control element varies. The controller utilizes the delta relationship to update a configuration parameter to the multimedia presentation device 106B on the other side of the teleconference. The configuration parameter may include adjusting the microphone gain or audio bias for the multimedia presentation device 106B. The sensor 202A, controller, and the multimedia presentation device 106B continue this process until the delta relationship is minimized.

In the event, the feedback loop fails to determine a corrective action that minimizes the delta relationship, the controller may provide suggestions to the user, through the multimedia presentation device 106A, 106B. The suggestions may include but are not limited to adjusting ambient lighting in the physical space and repositioning the multimedia presentation device 106A, 106B.

Figure 3:
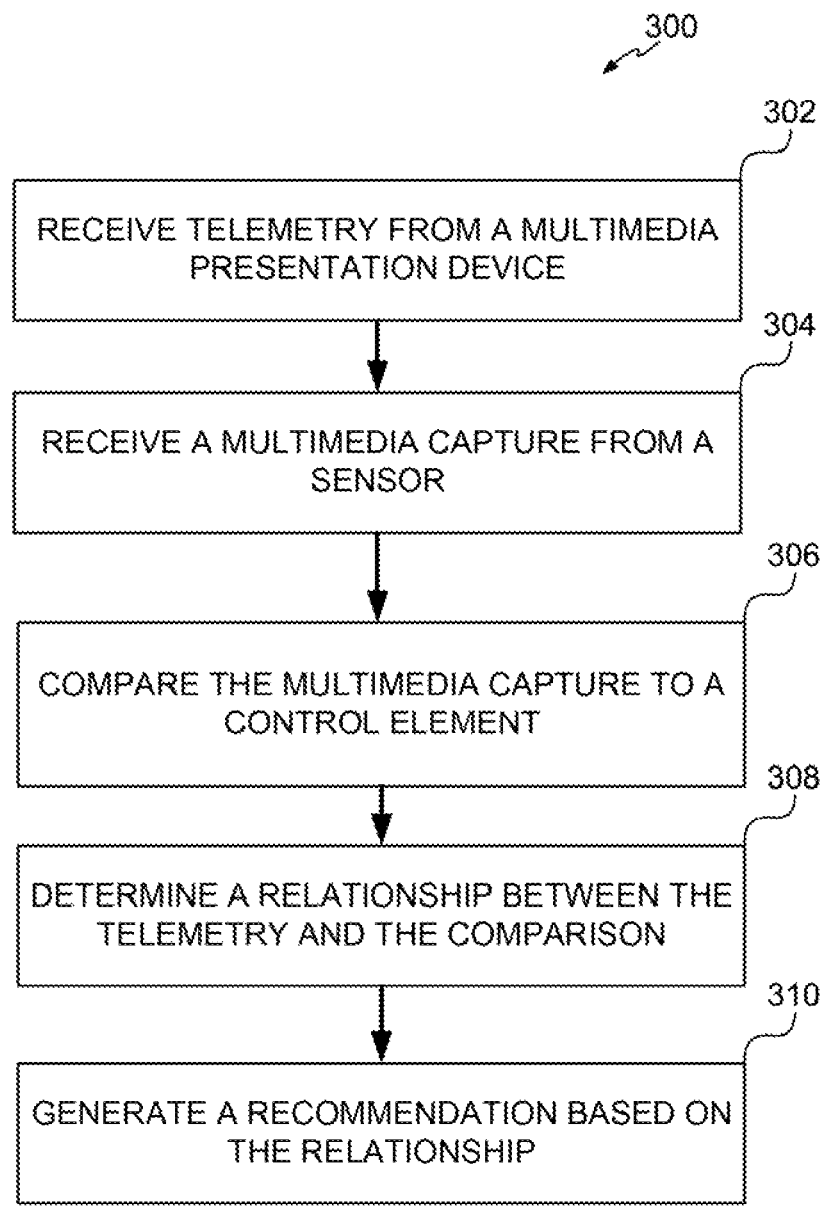
FIG. 3 is a flow diagram illustrating a method to control adjusted multimedia presentation devices, according to an example.

FIG. 3 is a flow diagram 300 illustrating a method to control adjusted multimedia presentation devices, according to an example.

At step 302, the controller receives telemetry from a multimedia presentation device. The telemetry may include network data metrics. The telemetry may include information relating to any network service interruptions including but not limited to dropped packets and latency issues.

At step 304, the controller receives a multimedia capture from a sensor. The multimedia capture corresponds to a capture of a teleconferencing session. As described above, the multimedia capture from the sensor may include a video capture from the sensor of the multimedia presentation device and the associated video and audio streams presented on it.

At step 306, the controller compares the multimedia capture to a control element. The controller evaluates the multimedia capture of the control element within the digital capture stream to a known value of the control element. The identification of the control element within the multimedia capture may be implemented utilizing pattern recognition artificial intelligence algorithms. Once the control element has been identified within the multimedia capture, the known value of the control element may be determined utilizing differences between the identified control element and the known values.

At step 308, the controller determines a relationship between the telemetry and the comparison. Utilizing timing information included in the telemetry, the controller may determine a relationship between a network transmission issue expressed in the telemetry and the resultant comparison of the control element. For example, if there is a large delta relationship between an audio sample within the multimedia capture compared to the known control element corresponding to audio distortion of a user's voice, the timing relationship between the telemetry and the time of the comparison may indicate an issue with the transmission of the audio from one multimedia presentation device to another.

At step 310, the controller generates a recommendation based on the relationship. In the above example of audio distortion, the controller may determine the relationship between the telemetry and the comparison to be minimal. In one implementation, the controller may generate a recommendation for the user to move an audio input component of the multimedia presentation device closer to the user. In another implementation, the controller may generate a recommendation for the user to move the audio input component of the multimedia presentation device away from an audio output component of the multimedia presentation device.

Figure 4:
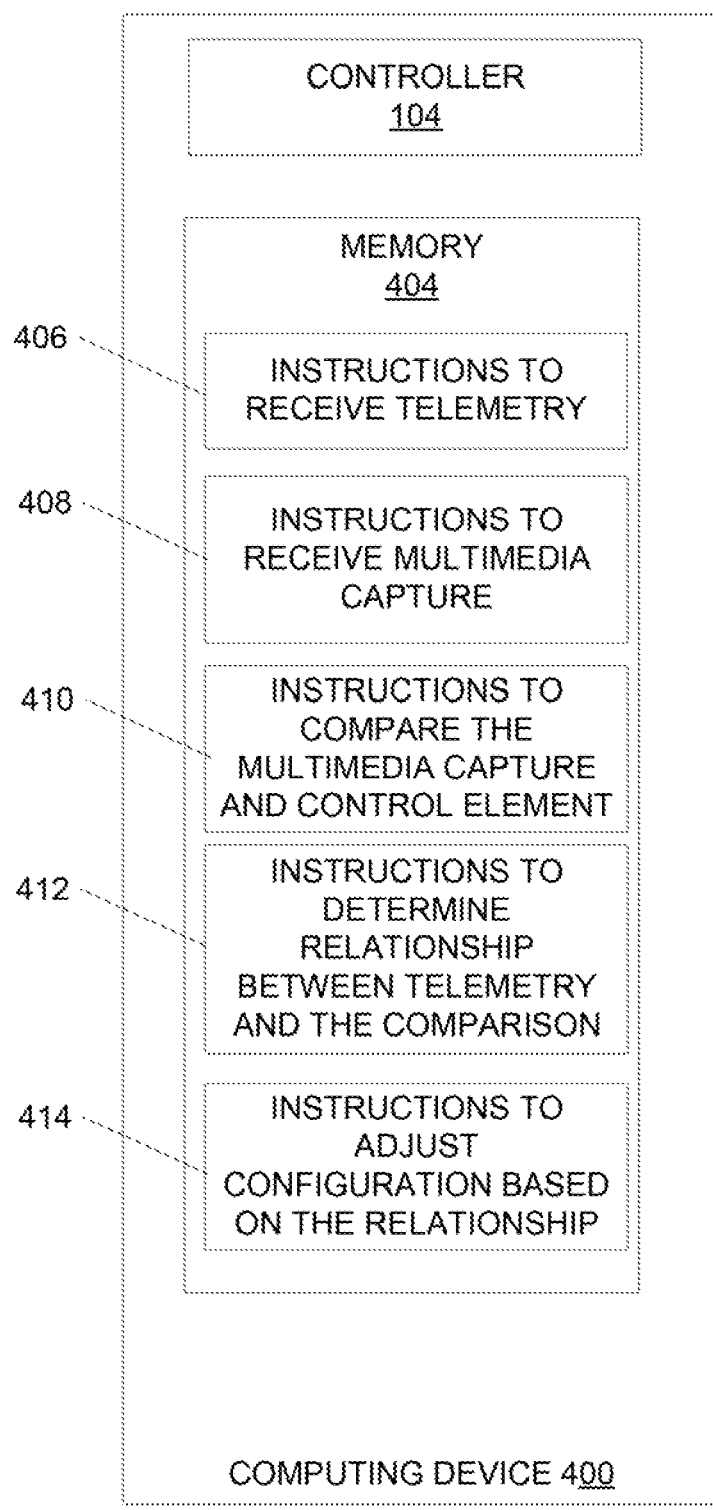
FIG. 4 is a computing device for supporting controlling adjusted multimedia presentation devices, according to an example.

FIG. 4 is a computing device for supporting controlling adjusted multimedia presentation devices, according to an example. The computing device 400 depicts a controller 104 and a memory 404 and, as an example of the computing device 400 performing its operations, the memory device 404 may include instructions 406-414 that are executable by the controller 104. In one implementation, the instructions 406-414 may implement the method as described in relation to FIG. 3. The controller 104 may be synonymous with the processor found in common computing environments including but not limited to central processing units (CPUs). The memory 404 can be said to store program instructions that, when executed by controller 104, implement the components of the computing device 400. The executable program instructions stored in the memory 404 include, as an example, instructions to receive a telemetry 406, instructions to receive a multimedia capture 408, instructions to compare the multimedia capture and a control element 410, instructions to determine a relationship between the telemetry and the comparison 412 and instructions to adjust the configuration of the multimedia presentation device based on the relationship 414.

Memory 404 represents generally any number of memory components capable of storing instructions that can be executed by controller 104. Memory 404 is non-transitory in the sense that it does not encompass a transitory signal but instead is made up of at least one memory component configured to store the relevant instructions. As a result, the memory 404 may be a non-transitory computer-readable storage medium. Memory 404 may be implemented in a single device or distributed across devices. Likewise, controller 104 represents any number of processors capable of executing instructions stored by memory device 504. Controller 104 may be integrated in a single device or distributed across devices. Further, memory 404 may be fully or partially integrated in the same device as controller 104, or it may be separate but accessible to that device and controller 104.

In one example, the program instructions 406-414 can be part of an installation package that, when installed, can be executed by controller 104 to implement the components of the computing device 400. In this case, memory 404 may be a portable medium such as a CD, DVD, or flash drive, or a memory maintained by a server from which the installation package can be downloaded and installed. In another example, the program instructions may be part of an application or applications already installed. Here, memory 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
a sensor,
a multimedia presentation device,
a controller communicatively coupled to the sensor and the multimedia presentation device to:
receive telemetry from the multimedia presentation device,
receive a multimedia capture from the sensor, wherein the multimedia capture corresponds to multimedia presentation on the multimedia presentation device,
compare the multimedia capture to a control element,
determine a relationship between the telemetry and the comparison, and
correct a configuration of the multimedia presentation device based on the relationship.

2. The system of claim 1 wherein the telemetry comprises metrics corresponding to the multimedia presentation.

3. The system of claim 1 wherein the control element comprises a display pattern of a control color and control shape and the configuration comprises a lighting parameter.

4. The system of claim 1 wherein the control element comprises a sound sample and the configuration comprises a sound parameter.

5. The system of claim 1 wherein the correcting a configuration comprises generating a suggestion of correction to a user for a parameter outside a control of the multimedia presentation device.

6. The system of claim 5, wherein the suggestion comprises one of: adjusting ambient lighting, and repositioning the multimedia presentation device.

7. The system of claim 1, wherein the sensor comprises:
a camera arranged to image the multimedia presentation device in operation; or
a microphone in a same physical space as the multimedia presentation device.

8. The system of claim 1, wherein the telemetry comprises information related to dropped packets or latency issues to the multimedia presentation device.

9. The system of claim 1, wherein the controller comprises logic to access and modify the configuration of the multimedia presentation device via an application programming interface (API).

10. The system of claim 1, wherein a correction to the configuration of the multimedia presentation device comprises one of: adjusting microphone gain, adjusting audio bias, adjusting hue, and adjusting saturation.

11. A method comprising:
receiving telemetry from a multimedia presentation device, receiving a multimedia capture from a sensor, wherein the multimedia capture corresponds to multimedia presentation on the multimedia presentation device, comparing the multimedia capture to a control element, determining a relationship between the telemetry and the comparison, and identify a recommendation based on the relationship.

12. The method of claim 11 further comprising controlling an audio bias input parameter of the multimedia presentation device based on the relationship.

13. The method of claim 11 wherein the telemetry comprises metrics corresponding to the multimedia presentation.

14. The method of claim 11 wherein the control element comprises a display pattern of a control color and control shape.

15. The method of claim 11 wherein the control element comprises a sound sample.

16. A non-transitory computer readable medium comprising a memory having instructions stored thereon and a controller configured to perform, when executing the instructions to:

receive telemetry from a multimedia presentation device, receive a multimedia capture from a sensor, wherein the multimedia capture corresponds to multimedia presentation on the multimedia presentation device, compare the multimedia capture to a control element, determine a relationship between the telemetry and the comparison, wherein the relationship corresponds to an event in the telemetry and a delta threshold in the comparison; and adjust a configuration of the multimedia presentation device based on the relationship.

17. The non-transitory computer readable medium of claim 16 further comprising controlling an audio bias input parameter of the multimedia presentation device based on the relationship.

18. The non-transitory computer readable medium of claim 16 wherein the telemetry comprises metrics corresponding to the multimedia presentation.

19. The non-transitory computer readable medium of claim 16 wherein the control element comprises a display pattern of a control color and control shape.

20. The non-transitory computer readable medium of claim 16 wherein the control element comprises a sound sample.

* * * * *